US012710571B2

(12) United States Patent
McDowall et al.

(10) Patent No.: US 12,710,571 B2
(45) **Date of Patent: *Aug. 18, 2026**

(54) IMAGE VIEWING SYSTEMS AND METHODS USING A BLACK GLASS MIRROR

(71) Applicant: Intuitive Surgical Operations, Inc., Sunnyvale, CA (US)

(72) Inventors: Ian E. McDowall, Woodside, CA (US); Heath Feather, Cupertino, CA (US); Randal P. Goldberg, San Mateo, CA (US); Alexandre V. Matveev, Santa Clara, CA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 18/901,270

(22) Filed: Sep. 30, 2024

(65) Prior Publication Data

US 2025/0020836 A1 Jan. 16, 2025

Related U.S. Application Data

(63) Continuation of application No. 17/600,417, filed as application No. PCT/US2020/030260 on Apr. 28, 2020, now Pat. No. 12,117,627.

(Continued)

(51) Int. Cl.
*G02B 5/08* (2006.01)
*G02B 5/20* (2006.01)
(Continued)

(52) U.S. Cl.
CPC .......... *G02B 5/0808* (2013.01); *G02B 5/208* (2013.01); *G02B 27/0093* (2013.01);
(Continued)

(58) Field of Classification Search
CPC ...... G02B 5/0808; G02B 30/35; G02B 5/208; G02B 27/0093; G02B 27/288; G06T 7/70;
(Continued)

(56) References Cited

U.S. PATENT DOCUMENTS 8,767,306 B1 7/2014 Miao et al.
10,599,215 B2 * 3/2020 Yoon ...................... G06F 3/013
(Continued)

FOREIGN PATENT DOCUMENTS

CN 205539546 U 8/2016

OTHER PUBLICATIONS

International Preliminary Report on Patentability for Application No. PCT/US2020/030260 mailed on Nov. 11, 2021, 8 pages.
(Continued)

*Primary Examiner* — Sunghyoun Park
(74) *Attorney, Agent, or Firm* — ALG Intellectual Property, LLC

(57) ABSTRACT

An exemplary image viewing system includes a display device configured to emit visible light representative of an image provided for display by the image viewing system, an infrared light source configured to emit infrared light, a viewing lens, and a black glass mirror provided between the infrared light source and the viewing lens. The black glass mirror comprises black glass and a coating on an outer surface of the black glass. The coating is configured to reflect a first portion of the visible light emitted from the display device towards the viewing lens, pass a second portion of the visible light emitted from the display device to the black glass, and pass a portion of the infrared light emitted from the infrared light source toward the viewing
(Continued)

lens. The black glass is configured to pass the portion of the infrared light and absorb the second portion of the visible light.

20 Claims, 11 Drawing Sheets

Related U.S. Application Data

(60) Provisional application No. 62/841,200, filed on Apr. 30, 2019.

(51) Int. Cl.

| | |
|---|---|
| ***G02B 27/00*** | (2006.01) |
| ***G02B 27/28*** | (2006.01) |
| ***G02B 30/35*** | (2020.01) |
| ***G06T 7/70*** | (2017.01) |
| ***H04N 13/383*** | (2018.01) |
| ***H04N 23/56*** | (2023.01) |
| ***H04N 23/90*** | (2023.01) |

(52) U.S. Cl.
CPC .......... *G02B 27/288* (2013.01); *G02B 30/35* (2020.01); *G06T 7/70* (2017.01); *H04N 13/383* (2018.05); *H04N 23/56* (2023.01); *H04N 23/90* (2023.01); *G06T 2207/10048* (2013.01); *G06T 2207/30201* (2013.01)

(58) Field of Classification Search
CPC .......... G06T 2207/10048; G06T 2207/30201; H04N 13/383; H04N 23/56; H04N 23/90
See application file for complete search history.

(56) References Cited

U.S. PATENT DOCUMENTS

| | | | | |
|---|---|---|---|---|
| 10,877,274 | B1 | 12/2020 | Trail | |
| 2007/0019099 | A1 | 1/2007 | Lieberman et al. | |
| 2007/0252953 | A1* | 11/2007 | Metzger | G02B 30/35 353/7 |
| 2013/0300837 | A1 | 11/2013 | Dicarlo et al. | |
| 2015/0268464 | A1 | 9/2015 | Ranalli et al. | |
| 2016/0278695 | A1 | 9/2016 | Wang et al. | |
| 2017/0034456 | A1 | 2/2017 | Kyung et al. | |
| 2017/0147859 | A1* | 5/2017 | Zhang | G06T 7/70 |
| 2017/0251137 | A1 | 8/2017 | Evans, V et al. | |
| 2018/0184054 | A1* | 6/2018 | Lundberg | G02B 7/006 |
| 2018/0275326 | A1 | 9/2018 | Kubo et al. | |
| 2018/0343402 | A1 | 11/2018 | Roth et al. | |
| 2019/0024857 | A1 | 1/2019 | Tian et al. | |
| 2019/0121115 | A1 | 4/2019 | Zhang | |
| 2019/0137669 | A1 | 5/2019 | Wheatley et al. | |
| 2019/0272423 | A1* | 9/2019 | Sung | G06V 10/141 |
| 2020/0204740 | A1 | 6/2020 | Tallaron et al. | |
| 2022/0187514 | A1 | 6/2022 | McDowall et al. | |

OTHER PUBLICATIONS

International search report and written opinion for Application No. PCT/US2020/030260 mailed on Jul. 13, 2020, 10 pages.

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

IMAGE VIEWING SYSTEMS AND METHODS USING A BLACK GLASS MIRROR

RELATED APPLICATIONS

The present application is a continuation of U.S. patent application Ser. No. 17/600,417, filed Sep. 30, 2021, which is a U.S. National Stage Application under 35 U.S.C. § 371 of International Application No. PCT/US2020/030260, filed Apr. 28, 2020, which claims priority to U.S. Provisional Patent Application No. 62/841,200, filed Apr. 30, 2019, each of which is hereby incorporated by reference in its entirety.

BACKGROUND INFORMATION

A computer-assisted surgical system that employs robotic and/or teleoperation technology typically includes a stereoscopic image viewer configured to provide, for display to a surgeon, imagery of a surgical space as captured by an endoscope. While the surgeon's eyes are positioned in front of viewing lenses of the stereoscopic image viewer, the surgeon may view the imagery of the surgical space while remotely manipulating one or more surgical instruments located within the surgical space.

A conventional stereoscopic image viewer typically includes a left display device that emits light representative of a left image intended for a left eye of the surgeon and a right display device that emits light representative of a right image intended for a right eye of the surgeon. The light emitted from the left and right display devices is reflected towards the viewing lenses by left and right mirrors, respectively.

Some stereoscopic image viewers are also configured to facilitate gaze tracking by the computer-assisted surgical system. For example, a stereoscopic image viewer may include an infrared ("IR") light source that emits IR light and an IR camera configured to generate images of the surgeon's eyes by capturing IR light that reflects off of the eyes. Various features included within the images generated by the IR camera may be used by the computer-assisted surgical system to determine where the surgeon is looking at any given time.

In such stereoscopic image viewers, the mirrors that reflect the light emitted from the display devices towards the viewing lenses are often implemented by dichroic mirrors. Dichroic mirrors advantageously reflect the light emitted by the display devices while at the same time passing the IR light generated by the IR light source. Unfortunately, however, dichroic mirrors are formed of multiple layers having different refractive indexes. This causes the dichroic mirrors to vary in performance based on the angle that the light emitted by the display devices reflects off the dichroic mirrors. This may result in suboptimal image quality (e.g., a color shift from one side of a displayed image to another side) and prevent the accurate reproduction of color, which is an important feature in computer-assisted surgical systems.

SUMMARY

An exemplary image viewing system includes a display device configured to emit visible light representative of an image provided for display by the image viewing system, an infrared light source configured to emit infrared light, a viewing lens, and a black glass mirror provided between the infrared light source and the viewing lens, the black glass mirror comprising black glass and a coating on an outer surface of the black glass, the coating being configured to reflect a first portion of the visible light emitted from the display device towards the viewing lens, pass a second portion of the visible light emitted from the display device to the black glass, and pass a portion of the infrared light emitted from the infrared light source toward the viewing lens; and the black glass being configured to pass the portion of the infrared light passed by the coating and absorb the second portion of the visible light.

An exemplary eye tracking system includes a display device configured to emit visible light representative of an image provided for display by the eye tracking system, an infrared light source configured to emit infrared light, a viewing lens, an imaging device that is provided adjacent to the infrared light source and that is configured to detect the infrared light after the infrared light is reflected off an eye of a user, and generate an image based on the detected infrared light, a processor configured to receive the generated image, and determine, based on the generated image, a gaze direction of the eye of the user, and a black glass mirror provided between the infrared light source and the viewing lens, the black glass mirror comprising black glass and a coating on an outer surface of the black glass, the coating being configured to reflect a first portion of the visible light emitted from the display device towards the viewing lens, pass a second portion of the visible light emitted from the display device to the black glass, and pass a portion of the infrared light emitted from the infrared light source toward the viewing lens, and the black glass being configured to pass the portion of the infrared light passed by the coating and absorb the second portion of the visible light.

An exemplary method includes emitting, by an image viewing system, visible light from a display device, the visible light representative of an image provided for display by the image viewing system, and emitting, by the image viewing system, infrared light from an infrared light source, the visible light and the infrared light being emitted toward a black glass mirror provided between the infrared light source and a viewing lens, the black glass mirror comprising black glass and a coating on an outer surface of the black glass, the coating being configured to reflect a first portion of the visible light emitted from the display device towards the viewing lens, pass a second portion of the visible light emitted from the display device to the black glass, and pass a portion of the infrared light emitted from the non-visible light source toward the viewing lens, and the black glass being configured to pass the portion of the infrared light passed by the coating and absorb the second portion of the visible light.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
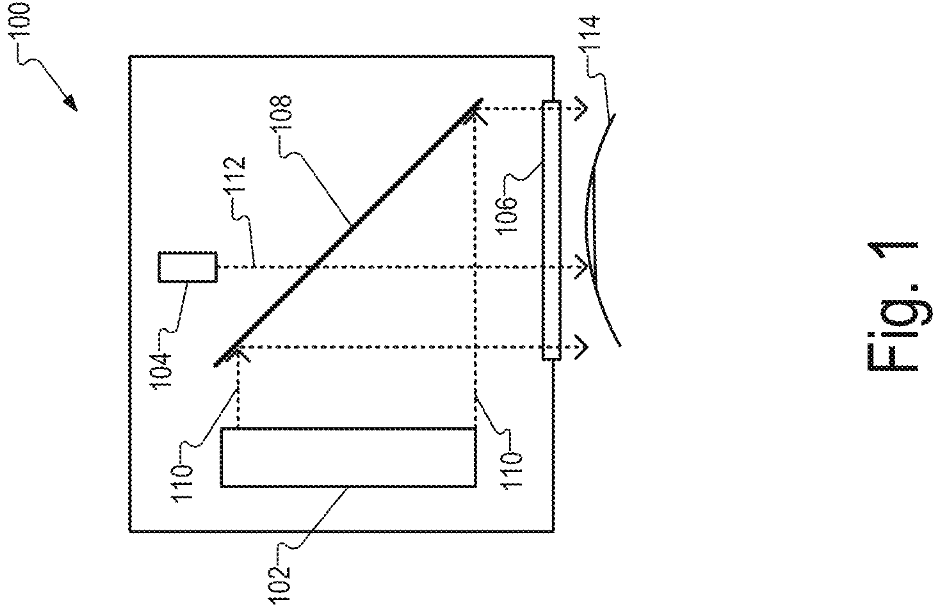
FIG. 1 illustrates an exemplary image viewing system according to principles described herein.

Image viewing systems and methods using a black glass mirror are described herein. As will be described in more detail below, an exemplary image viewing system includes a display device configured to emit visible light representative of an image provided for display by the image viewing system, an infrared light source configured to emit infrared light, a viewing lens, and a black glass mirror provided between the infrared light source and the viewing lens. The black glass mirror comprises black glass and a coating on an outer surface of the black glass. The coating is configured to reflect a first portion of the visible light emitted from the display device towards the viewing lens, pass a second portion of the visible light emitted from the display device to the black glass, reflect a first portion of the infrared light emitted from the infrared light source, and pass a second portion of the infrared light emitted from the infrared light source toward the viewing lens. The black glass is configured to pass the second portion of the infrared light passed by the coating and absorb the second portion of the visible light.

In certain examples, such image viewing systems may be included in or used in conjunction with eye tracking systems configured to determine a gaze direction of an eye of a user and/or capture an image of the eye or parts thereof for identification. As will be described in more detail below, an exemplary eye tracking system includes a display device configured to emit visible light representative of an image provided for display by the eye tracking system, an infrared light source configured to emit infrared light, a viewing lens, an imaging device that is provided adjacent to the infrared light source and that is configured to detect the infrared light after the infrared light is reflected off an eye of a user and generate an image based on the detected infrared light. The eye tracking system further includes a processor configured to receive the generated image and determine, based on the generated image, a gaze direction of the eye of the user. A black glass mirror is provided between the infrared light source and the viewing lens. The black glass mirror comprises black glass and a coating on an outer surface of the black glass. The coating is configured to reflect a first portion of the visible light emitted from the display device towards the viewing lens, pass a second portion of the visible light emitted from the display device to the black glass (the second portion of the visible light being largely absorbed by the black glass), reflect a first portion of the infrared light emitted from the infrared light source, and pass a second portion of the infrared light emitted from the infrared light source toward the viewing lens. The black glass is configured to pass the second portion of the infrared light passed by the coating and absorb the second portion of the visible light. The black glass further passes a reflection of the infrared light from the eye of the user back to an imaging device (e.g., camera configured to capture infrared light) located on the other side of the black glass mirror from the eye of the user. Any other infrared light from the eye of the user may also at least partly pass through the coating and the black glass of the black glass mirror to be observed by the imaging device.

Various advantages and benefits are associated with the systems and methods described herein. For example, by using a black glass mirror (the performance of which does not significantly vary based on the polarization and angle of incident light) to partially reflect light in an image viewing system instead of a dichroic mirror, it is possible to reduce color shifts from occurring across the displayed image. In addition, any portion of the visible light that passes through the coating of the black glass mirror is absorbed within the black glass, which prevents the visible light from reflecting off a backside or a second surface of the black glass and forming a double image viewable by a user, particularly for bright objects or features against a dark background. Moreover, one or more features of the exemplary image viewing systems described herein are configured to prevent or minimize fixed reflections that may otherwise hinder eye tracking. Accordingly, the systems and methods described herein improve image quality of an image provided for display by an image viewing system and improve eye tracking. These and other benefits that may be realized by the systems and methods described herein will be evident from the disclosure that follows.

FIG. 1 illustrates an exemplary image viewing system 100 that includes, without limitation, a display device 102, an infrared light source 104, a viewing lens 106 (illustrated in FIG. 1 as a plano-plano plate), and a black glass mirror 108. Image viewing system 100 may be implemented by any suitable device or assembly. For example, as will be described below, image viewing system 100 may be implemented by an image viewer (e.g., a monoscopic or a stereoscopic image viewer) included in a computer-assisted surgical system. Image viewing system 100 may additionally or alternatively be implemented by an image viewer included in any other medical imaging system, a non-medical imaging system (e.g., a headset included in a virtual and/or augmented reality display system), and/or any other type of display system as may serve a particular implementation.

Although FIG. 1 shows system 100 as having an infrared light source 104, it is understood that any suitable non-visible light source configured to emit any suitable type of non-visible light may be used in place of infrared light source 104 in certain examples.

As shown in FIG. 1, display device 102 emits visible light 110 representative of an image towards black glass mirror 108. Display device 102 may include any suitable display screen (e.g., a liquid crystal display (LCD) screen) that may be configured to emit visible light 110.

The image represented by visible light 110 may be generated, for example, by an imaging device (e.g., an endoscope) and provided to display device 102 in any suitable manner. Black glass mirror 108 is positioned within image viewing system 100 such that visible light 110 reflects off a surface of black glass mirror 108 towards viewing lens 106.

Infrared light source 104 is configured to emit infrared light 112 towards black glass mirror 108. Any suitable infrared light source may be used as may serve a particular implementation. For example, infrared light source 104 may be implemented by an infrared light emitter, such as one or more infrared light emitting diode(s) (IR LED), that is/are configured to emit infrared light. As shown in FIG. 1, infrared light 112 emitted from infrared light source 104 passes through black glass mirror 108 toward viewing lens 106 and toward an eye 114 of a user.

Black glass mirror 108 comprises black glass and a coating on an outer surface of the black glass. As used herein, "black glass" refers to any suitable tint, color, shade, and/or darkness of glass that is capable of absorbing visible light that enters therein and passing non-visible light such as infrared light. For example, the black glass used in black glass mirror 108 may range in cut-on wavelength from 690 nm black glass (which may appear brown) to 1000 nm black glass (which may appear black). In certain implementations, black glass may also include glass in any suitable shade of dark green or amber such that the glass appears black. In certain examples, the black glass may completely absorb the visible light that enters therein. Alternatively, the black glass may absorb most of the visible light such that any portion of visible light that passes therethrough and reflects off a surface of the black glass does not produce a noticeable double image. In black glass mirrors such as black glass mirror 108, the reflective characteristics are achieved through a coating, which may also have a protective transparent layer, as opposed to other types of mirrors (e.g., dichroic mirrors) that use a plurality of layers with different refractive indexes to achieve the visible reflective characteristics while passing, for example, infrared light.

It is understood that while the expression "black glass mirror" is used herein, the actual appearance of 'black' glasses, such as those in the Schott RG series, may be black or dark brown depending on the specific glass, illuminant, and observer. Additionally, while a black glass mirror may be made of black glass, alternative examples may be fabricated from a number of similarly performing black plastic materials which have similar properties of largely absorptive behavior in the visible spectrum and transmissive behavior in the infrared spectrum. For example, a molded black plastic may be used in certain implementations. However, glass generally offers better quality surfaces over a large area for overall performance.

Black glass mirror 108 is shown being flat in FIG. 1. However, it is understood that, in the methods and systems described herein, any suitable optical power may be provided by a black glass mirror or that could be built into the black glass mirror. For example, black glass mirror 108 may have a convex or a concave surface in certain implementations.

FIG. 1 shows black glass mirror 108 at forty-five degrees with respect to display device 102 and eye 114. However, it is understood that such an orientation is merely provided as an example. Alternative implementations may use other angles of black glass mirror 108 to fold the light path from display device 102 differently and at other suitable angles. In certain examples, the angle of incidence of visible light 110 across black glass mirror 108 may vary in angle of incidence.

Figure 2:
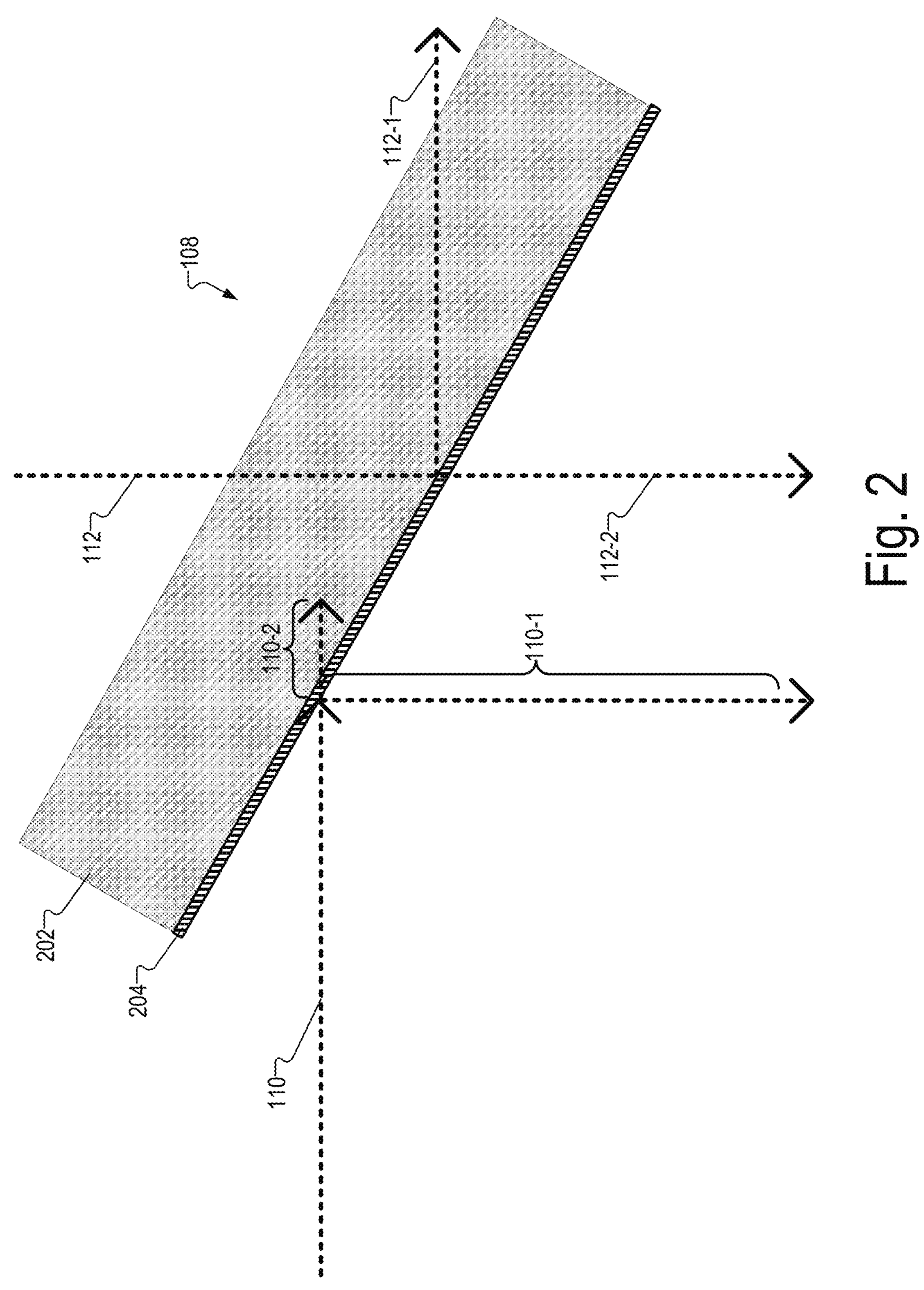
FIG. 2 illustrates an exemplary cross-sectional view of a black glass mirror according to principles described herein.

FIG. 2 shows an exemplary enlarged cross-sectional view of black glass mirror 108. As shown in FIG. 2, black glass mirror 108 comprises black glass 202 and a coating 204 deposited on an outer surface of black glass 202. In certain examples coating 204 may comprise a metal. Coating 204 may include any suitable metal or combination of metals configured to reflect at least some of visible light 110 and pass infrared light 112. For example, coating 204 may include silver, aluminum, or some combination thereof. A transparent layer may be deposited over the metal to protect it from corrosion. Such a transparent layer may be particularly applicable when using silver for coating 204. As shown in FIG. 2, coating 204 is configured to reflect a first portion 110-1 of visible light 110 emitted from display device 102 and pass a second portion 110-2 of visible light 110 emitted from display device 102 to black glass 202. Coating 204 is at least partially transmissive so that infrared light 112 emitted from infrared light source 104 passes through coating 204 towards viewing lens 106. As shown in FIG. 2, a first portion 112-1 of infrared light 112 is reflected by coating 204 and a second portion 112-2 of infrared light 112 is passed through coating 204 and black glass 202. In addition, a portion (not shown) of infrared light 112 may be absorbed in coating 204 and lost.

While a metallic coating used for coating 204 may be considered as being less light efficient when compared to a dichroic mirror because a metallic coating may only transmit a fraction of infrared light, the advantages in image quality outweigh that inefficiency.

Any suitable other type of coating may be used for coating 204 as long as such a coating: (a) reflects a first portion of visible light; (b) transmits a second portion of the visible light; and (c) does not impart an objectionable color change (e.g., the reflectance, transmission, and absorbance over the visible spectrum) for a given implementation, some implementations being more demanding than others. Thus, in certain implementations, a system may be comprised of a display device, a curved black plastic reflector that reflects some portion of the visible light emitted from the display device, and an imaging device (e.g., a camera) configured to capture an image of at least one eye through the black plastic reflector.

In certain examples, the amount of visible light 110 that coating 204 is configured to reflect may be achieved by selecting the thickness of coating 204 during manufacture. For example, a relatively thinner coating 204 may reflect less visible light 110 than a relatively thicker coating 204. Coating 204 may reflect any suitable percentage of visible light 110 as may serve a particular implementation. For example, first portion 110-1, which is reflected by coating 204, may comprise up to ninety-nine percent of visible light 110 emitted from display device 102. That is, in certain examples, coating 204 may be configured to reflect ninety-nine percent of visible light 110 and pass one percent of visible light 110. In certain alternative examples, coating 204 may be configured to reflect ninety percent of visible light 110 and pass ten percent of visible light 110. The proportions of reflection and transmission may be selected based on the particular implementation while taking into account the light absorbed by coating 204.

Black glass 202 is configured to pass infrared light 112 and absorb second portion 110-2 of visible light 110. As shown in FIG. 2, second portion 110-2 of visible light 110 enters black glass 202 but (largely) does not reach an opposite surface of black glass 202 that is opposite to the surface on which coating 204 is disposed. As a result, black glass 202 beneficially prevents a double image from being viewable due to a reflection of visible light 110 on the opposite surface, thereby improving image quality of the image displayed by image viewing system 100.

In the example shown in FIG. 2, black glass 202 is shown as being a single layer of black glass on which coating 204 is disposed. However, black glass mirror 108 may have additional layers and/or coatings in other implementations. For example, the surface of black glass mirror 108 that is opposite to the surface to which coating 204 is disposed may have an anti-reflective coating for infrared light 112 in certain implementations. Additionally or alternatively, a protective coating may be provided on coating 204 in certain implementations to prevent oxidation of coating 204 and/or to improve robustness of coating 204.

Figure 3:
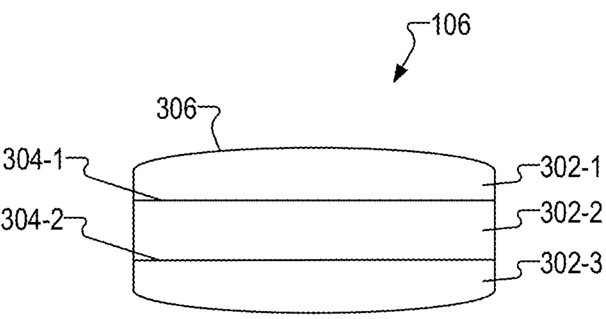
FIG. 3 illustrates an exemplary viewing lens according to principles described herein.

Returning to FIG. 1, viewing lens 106 is configured to pass visible light 110 reflected by black glass mirror 108 and pass infrared light 112 after infrared light 112 passes through black glass mirror 108. Viewing lens 106 may have any suitable configuration as may serve a particular implementation. In certain examples, viewing lens 106 may include a single lens. Alternatively, viewing lens 106 may include a plurality of lenses. In certain examples, the plurality of lenses may be combined together (e.g., glued or otherwise adhered together) to form a single lens structure. To illustrate, FIG. 3 shows an example in which viewing lens 106 includes lenses 302-1 through 302-3 that are combined together to form a single lens structure. As shown in FIG. 3, lenses 302-1 through 302-3 define an inner surface 304-1 between lens 302-1 and lens 302-2 and an inner surface 304-2 between lens 302-2 and lens 302-3. Although FIG. 3 shows three lenses 302, it is understood that viewing lens 106 may include any suitable number of lenses, airspaces, and/or glued interfaces as may serve a particular implementation.

In certain examples, an anti-reflective coating for infrared light 112 and/or visible light 110 may be provided on one or more surfaces of viewing lens 106. Such an anti-reflective coating is configured to prevent or minimize reflections (e.g., reduce the size of reflections) caused due to infrared light 112 reflecting off one or more surfaces of viewing lens 106. Any suitable anti-reflective coating may be used as may serve a particular implementation. In the example shown in FIG. 3, an anti-reflective coating may be provided on an outer surface 306 (e.g., on all or part of an outer perimeter) of viewing lens 106. For example, such an anti-reflective coating may be provided on a portion of surface 306 that faces black glass mirror 108 and/or that faces eye 114. Additionally or alternatively, an anti-reflective coating for infrared light 112 and/or visible light 110 may be provided on one or more inner surfaces included in viewing lens 106 (e.g., on inner surface 304-1 and/or inner surface 304-2).

Figure 4:
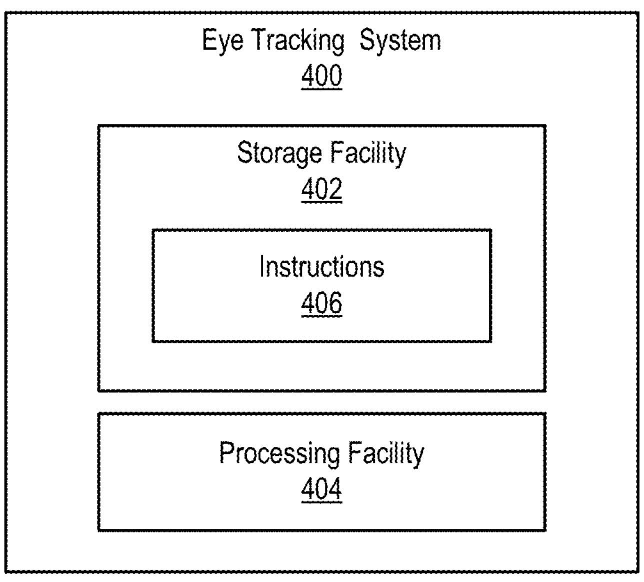
FIG. 4 illustrates an exemplary eye tracking system according to principles described herein.

In certain examples, image viewing system 100 may be incorporated in or used in conjunction with an eye tracking system that is configured to determine a gaze direction of one or both eyes of a user. FIG. 4 illustrates an exemplary eye tracking system 400. As shown, eye tracking system 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data received, generated, managed, used, and/or transmitted by processing facility 404. For example, storage facility 402 may maintain any suitable data associated with displaying an image and/or tracking a gaze direction of eyes of a user.

Processing facility 404 may be configured to perform (e.g., execute instructions 406 stored in storage facility 402) various processing operations associated with displaying an image to a user and tracking a gaze direction of eyes of a user. For example, processing facility 404 may receive a captured image of an eye (e.g., eye 114) of the user and determine a position of a reflection in the captured image with respect to the pupil of the eye. Based on the determined position, processing facility 404 may determine a gaze direction of the eye of the user. Processing facility 404 may control an eye tracking camera and an illumination device used to illuminate the eye (e.g., with infrared light) for the eye tracking camera. These and other operations that may be performed by processing facility 404 are described herein.

Figure 5:
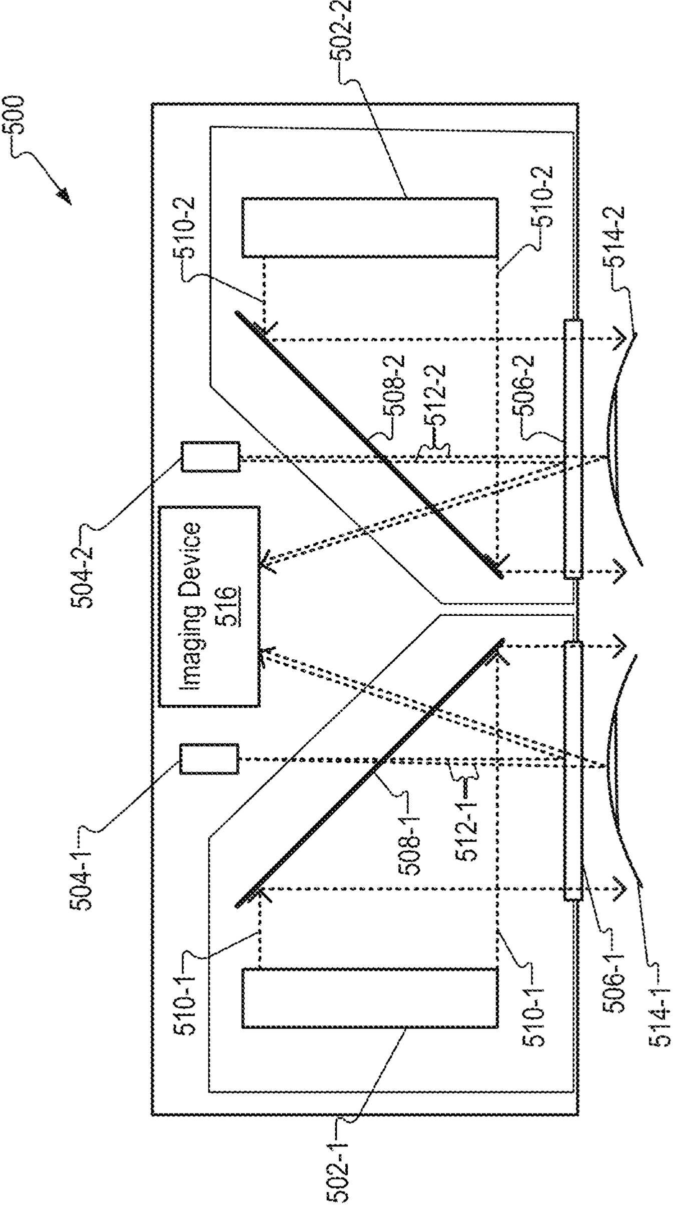
FIGS. 5-7 illustrate various exemplary image viewing systems that may be included in or used in conjunction with an eye tracking system according to principles described herein.

FIG. 5 shows an exemplary image viewing system 500 that may be included as part of or used in conjunction with eye tracking system 400. As shown in FIG. 5, image viewing system 500 includes display devices 502 (e.g., display devices 502-1 and 502-2), infrared light sources 504 (e.g., infrared light sources 504-1 and 504-2), viewing lenses 506 (e.g., viewing lenses 506-1 and 506-2), black glass mirrors 508 (e.g., black glass mirrors 508-1 and 508-2), and an imaging device 516.

Display devices 502 may be configured in a manner similar to display device 102 shown in FIG. 1. As shown in FIG. 5, display device 502-1 emits visible light 510-1 representative of an image towards black glass mirror 508-1 and display device 502-2 emits visible light 510-2 representative of an image towards black glass mirror 508-2. Visible light 510-1 and visible light 510-2 reflect off respective surfaces of black glass mirrors 508-1 and 508-2 towards viewing lenses 506-1 and 506-2.

Infrared light sources 504-1 and 504-2 are configured to emit infrared light 512-1 and infrared light 512-2 towards respective black glass mirrors 508-1 and 508-2. As shown in FIG. 5, infrared light 512-1 and infrared light 512-2 emitted from infrared light sources 504-1 and 504-2 pass through black glass mirrors 508-1 and 508-2 toward viewing lenses 506-1 and 506-2 and toward respective eyes 514-1 and 514-2 of a user. As mentioned herein, some of infrared light 512-1 and infrared light 512-2 may be reflected by a coating of black glass mirrors 508-1 and 508-2 and some may be absorbed.

Black glass mirrors 508-1 and 508-2 may be configured in a manner similar to that described above with respect to black glass mirror 108 shown in FIGS. 1 and 2. For example, black glass mirrors 508-1 and 508-2 each comprise black glass and a metallic coating on an outer surface of the black glass, such as described herein.

Viewing lenses 506-1 and 506-2 may be configured in a manner similar to that described above with respect to viewing lens 106 shown in FIGS. 1 and 3. For example, viewing lens 506-1 is configured to pass visible light 510-1 reflected by black glass mirror 508-1 and pass at least a portion of infrared light 512-1 after infrared light 512-1 passes through black glass mirror 508-1. Similarly, viewing lens 506-2 is configured to pass visible light 510-2 reflected by black glass mirror 508-2 and pass at least a portion of infrared light 512-2 after infrared light 512-2 passes through black glass mirror 508-2. As shown in FIG. 5, a portion of infrared light 512-1 and infrared light 512-2 is illustrated as reflecting off lenses 506-1 and 506-2. However, such reflections may be prevented or minimized, for example, by an anti-reflective coating provided on one or more surfaces of lenses 506-1 and 506-2, such as described herein.

As shown in FIG. 5, imaging device 516 is provided adjacent to infrared light sources 504-1 and 504-2. Imaging device 516 is configured to detect infrared light 512-1 and 512-2 after infrared light 512-1 and 512-2 are reflected from viewing lenses 506-1 and 506-2 and/or eyes 514-1 and 514-2, and back through the system with various possible losses from viewing lenses 506-1 and 506-2 and at a coating on black glass mirrors 508-1 and 508-2 where some portion of infrared light 512-1 and 512-2 may be reflected. Based on the detected infrared light 512-1 and 512-2, imaging device 516 is further configured to generate an image of a glint and other features from eyes 514-1 and 514-2. Imaging device 516 may include any suitable type of camera or other type of image capture device capable of capturing an image of eyes 514 based on infrared light 512-1 and 512-2. In certain examples, imaging device 516 may be configured with multiple sensors to optimize for different imaging requirements associated with multiple infrared wavelengths.

In certain examples, imaging device 516 may include a filter that is configured to further block the capture of light that it outside a predetermined range of infrared light. For example, such a filter may be configured to block light with wavelengths shorter than 830 nanometers if infrared light sources 504-1 and 504-2 include 880 nanometer LEDs. Alternatively, such a filter may not be provided together with imaging device 516 if visible light 510-1, visible light 510-2, and/or any other visible light does not reach imaging device 516 due to such visible light being completely (or at least substantially) absorbed in the black glass included in black glass mirrors 508-1 and 508-2.

In certain examples, imaging device 516 may be configured to perform high dynamic range imaging. Such high dynamic range imaging may include imaging device 516 capturing multiple images and merging the captured images in any suitable manner to minimize reflections caused, for example, by infrared light 512-1 reflecting from one or more surfaces of lens 506-1.

Although FIG. 5 only shows one imaging device 516, it is understood that any suitable number of imaging devices may be used in certain implementations.

The image generated by imaging device 516 may be one of a sequence of images of eyes 514. Such a sequence of images may be used for any suitable purpose associated with tracking a gaze direction of eyes 514. Each image included in the sequence of images captured by imaging device 516 may include reflections of infrared light 512 from corneas of eyes 514 and/or fixed reflections. Fixed reflections may be caused by infrared light 512 reflecting off certain components included in image viewing system 500. For example, one or more fixed reflections may appear in the captured image due to infrared light 512-1 reflecting off each surface of viewing lens 506-1. The location of the one or more fixed reflections does not change as long as the spacing between viewing lenses 506-1 and 506-2 does not change. Corneal reflections, on the other hand, change location from one captured image to another captured image as a user's gaze direction changes.

Eye tracking system 400 (e.g., processing facility 404) may use such images captured by imaging device 516 in any suitable manner to determine a gaze direction of eyes 514. To that end, eye tracking system 400 may be configured to receive, in any suitable manner, images generated by imaging device 516. Based on the generated images, eye tracking system 400 may determine a gaze direction of eyes 514-1 and 514-2 in any suitable manner. For example, eye tracking system 400 may analyze the generated images to determine a positional relationship between the pupil of eye 514-1 and the corneal reflection caused by infrared light 512-1. Eye tracking system 400 may then infer the gaze direction of eye 514-1 in any suitable manner based on the determined positional relationship.

Eye tracking system 400 may use the determined gaze direction for any suitable purpose that may be associated with an image viewing system. For example, eye tracking system 400 may use the determined gaze direction to enhance the way a user interfaces with a computer-assisted surgical system. Such enhancements may include eye tracking system 400 translating the determined gaze direction into commands directed to the computer-assisted surgical system. For example, a command that may be generated based on a determined gaze direction may include an instruction to adjust a user interface element that controls some aspect of the computer-assisted surgical system. An exemplary computer-assisted surgical system is described herein.

Figure 6:
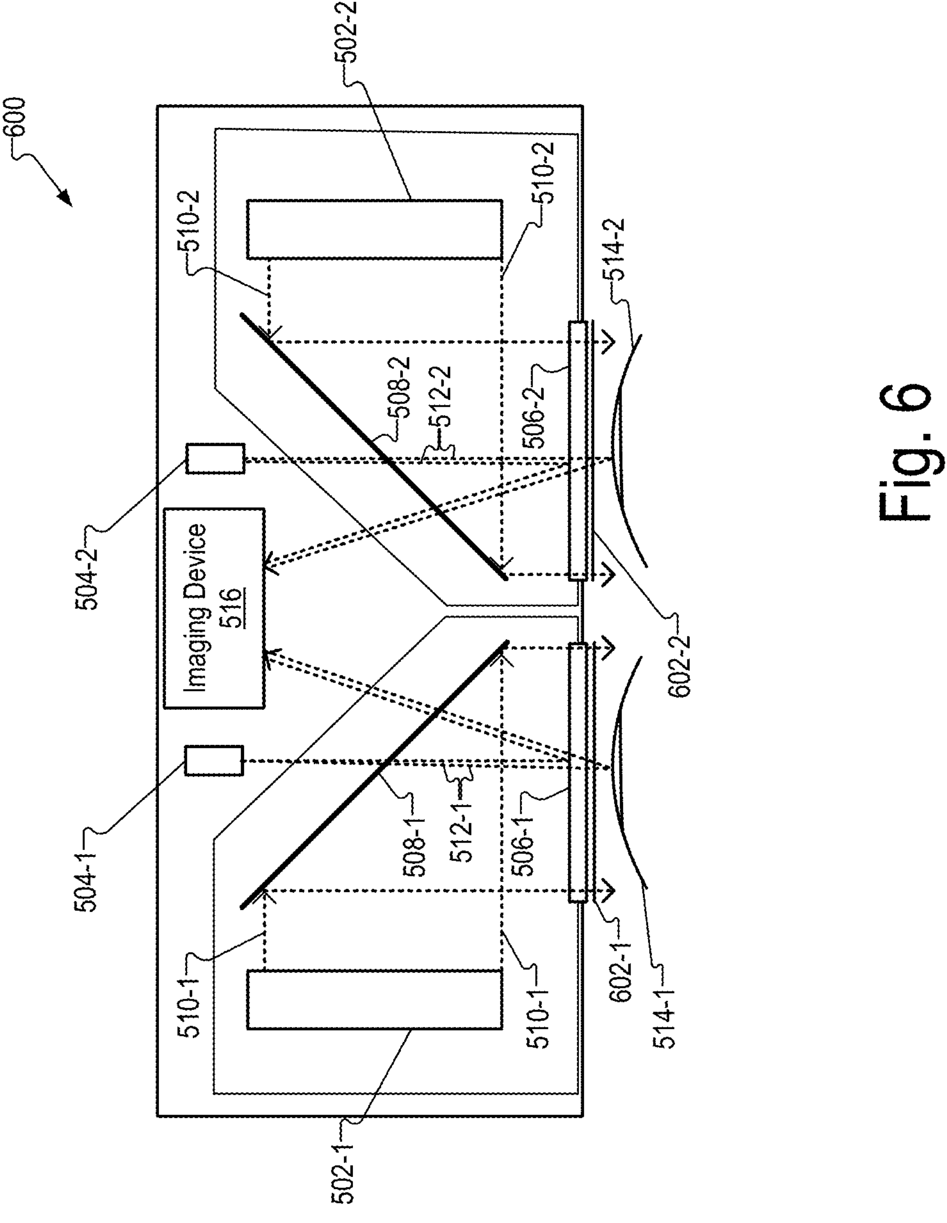

In certain examples, it may be possible for a user to directly view (e.g., out of the corner of the user's eye) the image generated by a display device at the same time as viewing the image reflected by a black glass mirror. To prevent such a double image from being viewable, an optical filter (e.g., a polarizer) may be provided between the black glass mirror and the eye of the user in certain examples. Such an optical filter is configured to pass infrared light emitted from an infrared light source and block visible light that has the same polarization that the visible light has prior to being reflected by the black glass mirror. To illustrate, FIG. 6 shows an exemplary image viewing system 600 that may be included as part of eye tracking system 400 and that includes optical filters 602 (e.g., optical filters 602-1 and 602-2). Image viewing system 600 is similar to image viewing system 500 except that optical filters 602 are provided. Optical filters 602 are configured to pass infrared light 512-1 and 512-2 and act as a polarizer with respect to visible light 510-1 and visible light 510-2 emitted by display devices 502-1 and 502-2. For example, the polarization of optical filter 602-1 may be crossed with respect to the polarization that visible light 510-1 has prior to being reflected by black glass mirror 508-1. Similarly, the polarization of optical filter 602-2 may be crossed with respect to the polarization that visible light 510-2 has prior to being reflected by black glass mirror 508-2.

In certain examples, the visible light emitted from a display device may already be polarized such that only one optical filter may be used to block the visible light from being viewable prior to reflecting off a black glass mirror, as is shown, for example, in FIG. 6. In certain alternative implementations, the visible light emitted from a display device may not be polarized. In such alternative implementations, an additional optical filter may be provided between a display device and a black glass mirror to polarize the visible light emitted from the display device. For example, in image viewing system 600 shown in FIG. 6, an additional optical filter (not shown) may be provided between display device 502-1 and black glass mirror 508-1 in certain implementations. In such examples, the polarization of optical filter 602-1 is crossed with respect to the polarization of the additional optical filter such that visible light 510-1 is not viewable by the user prior to being reflected by black glass mirror 508-1.

Optical filters 602 are shown in FIG. 6 as being provided respectively between viewing lenses 506-1 and 506-2 and eyes 514-1 and 514-2. However, it is understood that optical filters 602 may be provided in other locations in certain implementations. For example, optical filter 602-1 may be provided between black glass mirror 508-1 and viewing lens 506-1 in certain implementations. Similarly, optical filter 602-2 may be provided between black glass mirror 508-2 and viewing lens 506-2 in certain implementations. In certain examples, optical filters 602 may be provided separately from viewing lenses 506, as shown in FIG. 6. Alternatively, optical filters 602 may be incorporated as part of viewing lenses 506 in any suitable manner.

In certain examples, in addition to the infrared light source provided adjacent to the imaging device, an additional infrared light source may be provided on a user-facing side of the viewing lens. In such examples, the additional infrared light source is configured to illuminate an eye of a user with additional infrared light and the infrared light source adjacent to the imaging device is configured to generate the corneal reflection. With such a configuration, a relatively less powerful infrared light source may be provided adjacent to the imaging device because it is not necessary for the infrared light source adjacent to the imaging device to both illuminate an eye of the user as well as generate a corneal reflection. This in turn results in beneficially minimizing the fixed reflections that may be generated based on the infrared light emitted from the infrared light source adjacent to the imaging device reflecting from the viewing lens or some other component. Such a configuration also avoids a loss of light that may occur when infrared light passes through the coating on the black glass mirror, which loss may be substantial if the coating is predominantly reflective so the image from the display is largely conserved.

Figure 7:
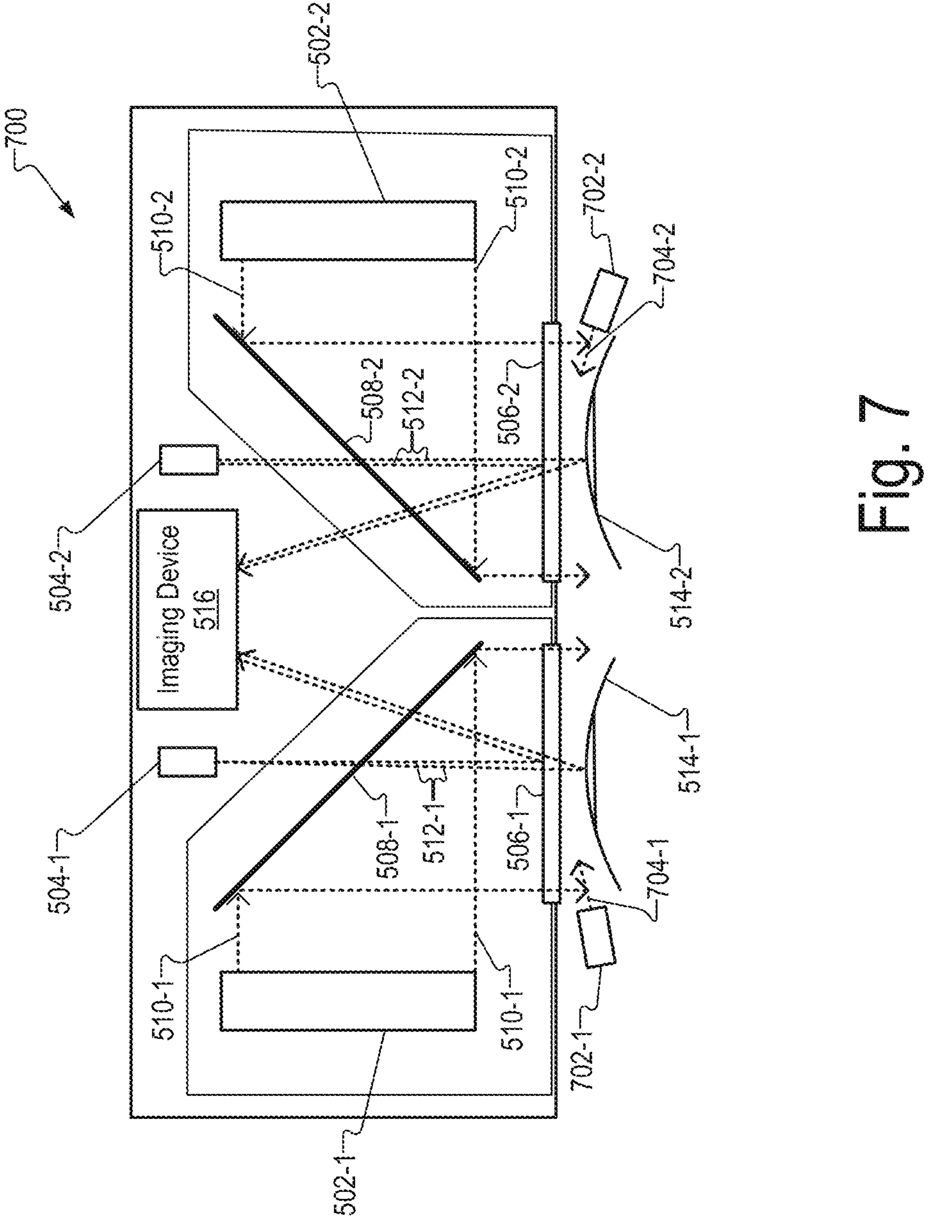

FIG. 7 shows an exemplary image viewing system 700 that may be included as part of or used in conjunction with eye tracking system 400 and that includes additional infrared light sources 702 (e.g., infrared light sources 702-1 and 702-2) in addition to infrared light sources 504. As shown in FIG. 7, image viewing system 700 is similar to image viewing system 500 except that an additional infrared light source 702 is provided on a user-facing side of each of viewing lenses 506-1 and 506-2. Infrared light source 702-1 is configured to illuminate eye 514-1 with infrared light 704-1 and infrared light source 702-2 is configured to illuminate eye 514-2 with infrared light 704-2. In certain examples, infrared light 704-1 and infrared light 704-2 may have the same wavelength as infrared light 512-1 and infrared light 512-2. Alternatively, infrared light 704-1 and infrared light 704-2 may have a different wavelength than infrared light 512-1 and infrared light 512-2 in certain implementations.

In some implementations, any of the image viewing systems and/or eye tracking systems described herein may operate as part of or in conjunction with a computer-assisted surgical system. As such, an exemplary computer-assisted surgical system will now be described. The described exemplary computer-assisted surgical system is illustrative and not limiting. Any of the image viewing systems and/or eye tracking systems described herein may operate as part of or in conjunction with the computer-assisted surgical system described herein and/or with other suitable computer-assisted surgical systems.

Figure 8:
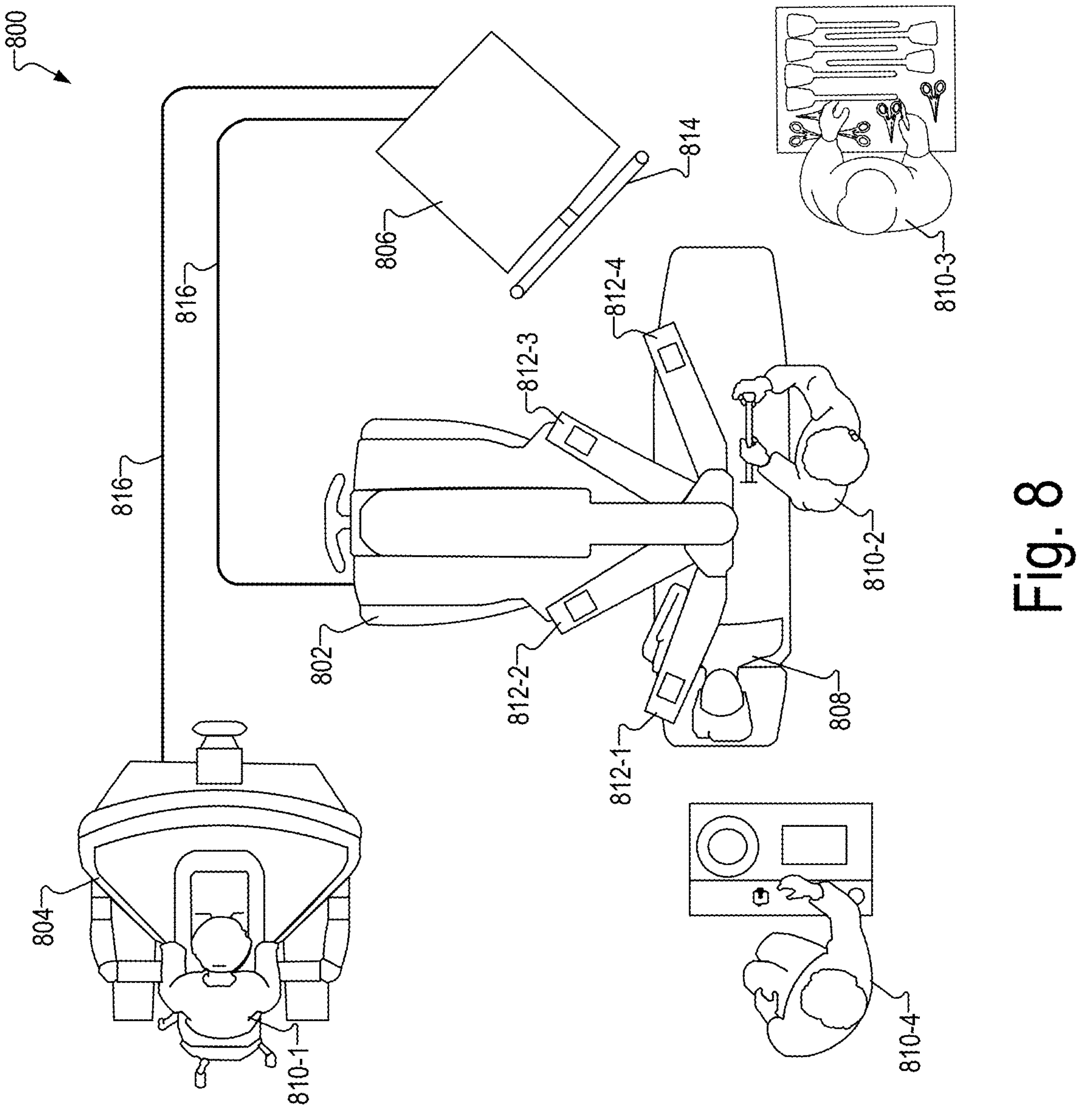
FIG. 8 illustrates an exemplary computer-assisted surgical system that includes an image viewing system and/or eye tracking system according to principles described herein.

FIG. 8 illustrates an exemplary computer-assisted surgical system 800 ("surgical system 800"). As shown, surgical system 800 may include a manipulating system 802, a user control system 804, and an auxiliary system 806 communicatively coupled one to another. In some examples, any of the image viewing systems and/or eye tracking systems described herein may be implemented by one or more of these components.

Surgical system 800 may be utilized by a surgical team to perform a computer-assisted surgical procedure on a patient 808. As shown, the surgical team may include a surgeon 810-1, an assistant 810-2, a nurse 810-3, and an anesthesiologist 810-4, all of whom may be collectively referred to as "surgical team members 810." Additional or alternative surgical team members may be present during a surgical session as may serve a particular implementation.

While FIG. 8 illustrates an ongoing minimally invasive surgical procedure, surgical system 800 may similarly be used to perform open surgical procedures or other types of surgical procedures that may similarly benefit from the accuracy and convenience of surgical system 800. Additionally, it will be understood that the surgical session throughout which surgical system 800 may be employed may not only include an operative phase of a surgical procedure, as is illustrated in FIG. 8, but may also include preoperative, postoperative, and/or other suitable phases of the surgical procedure. A surgical procedure may include any procedure in which manual and/or instrumental techniques (e.g., teleoperated instrumental techniques) are used on a patient to investigate, diagnose, or treat a physical condition of the patient. Additionally, a surgical procedure may include any procedure that is not performed on a live patient, such as a calibration procedure, a training procedure, and an experimental or research procedure.

As shown in FIG. 8, manipulating system 802 may include a plurality of manipulator arms 812 (e.g., manipulator arms 812-1 through 812-4) to which a plurality of surgical instruments (not shown) may be coupled. Each surgical instrument may be implemented by any suitable surgical tool (e.g., a tool having tissue-interaction functions), medical tool, monitoring instrument (e.g., an imaging device such as an endoscope), sensing instrument (e.g., a force-sensing surgical instrument), diagnostic instrument, or the like that may be used for a computer-assisted surgical procedure (e.g., by being at least partially inserted into patient 808 and manipulated to perform a computer-assisted surgical procedure on patient 808). While manipulating system 802 is depicted and described herein as including four manipulator arms 812, it will be recognized that manipulating system 802 may include only a single manipulator arm 812 or any other number of manipulator arms as may serve a particular implementation.

Manipulator arms 812 and/or surgical instruments attached to manipulator arms 812 may include one or more displacement transducers, orientational sensors, and/or positional sensors (hereinafter "surgical system sensors") used to generate raw (i.e., uncorrected) kinematics information. One or more components of surgical system 800 may be configured to use the kinematics information to track (e.g., determine positions of) and/or control the surgical instruments.

In addition, manipulator arms 812 may each include or otherwise be associated with a plurality of motors that control movement of manipulator arms 812 and/or the surgical instruments attached thereto. For example, manipulator arm 812-1 may include or otherwise be associated with a first internal motor (not explicitly shown) configured to yaw manipulator arm 812-1 about a yaw axis. In like manner, manipulator arm 812-1 may be associated with a second internal motor (not explicitly shown) configured to drive and pitch manipulator arm 812-1 about a pitch axis. Likewise, manipulator arm 812-1 may be associated with a third internal motor (not explicitly shown) configured to slide manipulator arm 812-1 along insertion axis. Manipulator arms 812 may each include a drive train system driven by one or more of these motors in order to control the pivoting of manipulator arms 812 in any manner as may serve a particular implementation. As such, if a surgical instrument attached, for example, to manipulator arm 812-1 is to be mechanically moved, one or more of the motors coupled to the drive train may be energized to move manipulator arm 812-1.

Surgical instruments attached to manipulator arms 812 may each be positioned at a surgical space associated with a patient. A "surgical space" may, in certain examples, be entirely disposed within a patient and may include an area within the patient at or near where a surgical procedure is planned to be performed, is being performed, or has been performed. For example, for a minimally invasive surgical procedure being performed on tissue internal to a patient, the surgical space may include the tissue, anatomy underlying the tissue, as well as space around the tissue where, for example, surgical instruments being used to perform the surgical procedure are located. In other examples, a surgical space may be at least partially disposed external to the patient at or near where a surgical procedure is planned to be performed, is being performed, or has been performed on the patient. For instance, surgical system 800 may be used to perform an open surgical procedure such that part of the surgical space (e.g., tissue being operated on) is internal to the patient while another part of the surgical space (e.g., a space around the tissue where one or more surgical instruments may be disposed) is external to the patient. A surgical instrument may be referred to as being positioned or located at or within a surgical space when at least a portion of the surgical instrument (e.g., a distal portion of the surgical instrument) is located within the surgical space.

Figure 9:
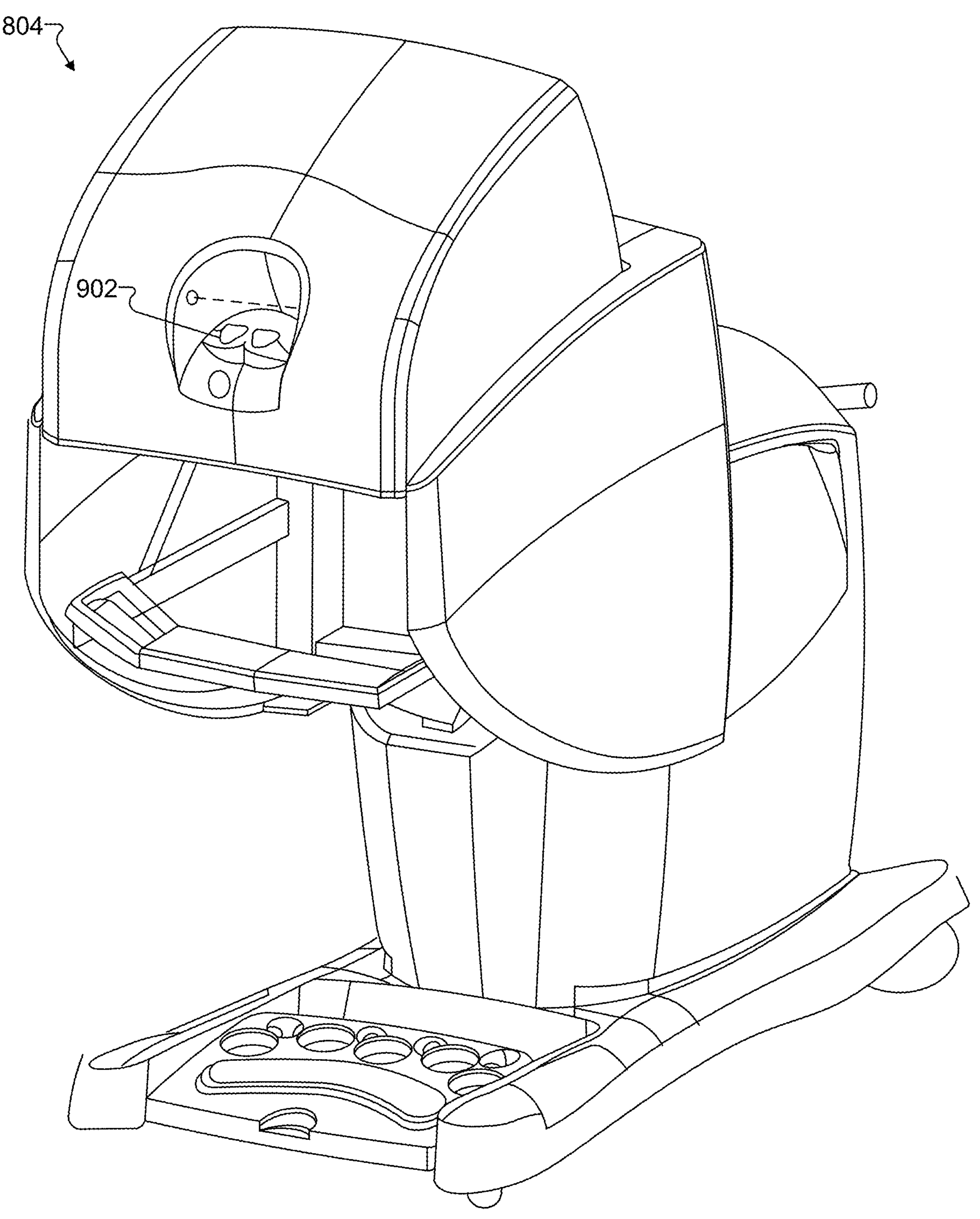
FIG. 9 illustrates a perspective view of a surgeon console according to principles described herein.

User control system 804 may be configured to facilitate control by surgeon 810-1 of manipulator arms 812 and surgical instruments attached to manipulator arms 812. For example, surgeon 810-1 may interact with user control system 804 to remotely move or manipulate manipulator arms 812 and the surgical instruments. To this end, user control system 804 may provide surgeon 810-1 with imagery (e.g., high-definition 3D imagery) of a surgical space associated with patient 808 as captured by an imaging device. FIG. 9 illustrates a perspective view of user control system 804. As shown, user control system 804 may include a stereo viewer 902, which may implement any of the image viewing systems and/or eye tracking systems described herein.

In certain examples, stereo viewer 902 has two displays where stereoscopic images of a surgical area associated with patient 808 and generated by a stereoscopic endoscope may be viewed by an operator (e.g., surgeon 810-1) during a surgical session. Surgeon 810-1 may utilize the imagery to perform one or more procedures with one or more surgical instruments attached to manipulator arms 812. In addition, stereo viewer 902 may be configured to track a gaze direction of surgeon 810-1 during the surgical session to facilitate control of surgical system 800 in any suitable manner and to be used for any suitable purpose, such as described herein. For example, a detected gaze direction may be used to automatically adjust a field of view of an endoscope attached to one of manipulator arms 812 during the surgical session.

Returning to FIG. 8, to facilitate control of surgical instruments, user control system 804 may include a set of master controls (not shown). These master controls may be manipulated by surgeon 810-1 to control movement of surgical instruments (e.g., by utilizing robotic and/or teleoperation technology). The master controls may be configured to detect a wide variety of hand, wrist, and finger movements by surgeon 810-1. In this manner, surgeon 810-1 may intuitively perform a surgical procedure using one or more surgical instruments.

User control system 804 may further be configured to facilitate control by surgeon 810-1 of other components of surgical system 800. For example, surgeon 810-1 may interact with user control system 804 to change a configuration or operating mode of surgical system 800, to change a display mode of surgical system 800, to generate additional control signals used to control surgical instruments attached to manipulator arms 812, to facilitate switching control from one surgical instrument to another, or to perform any other suitable operation. To this end, user control system 804 may also include one or more input devices (e.g., foot pedals, buttons, switches, etc.) configured to receive input from surgeon 810-1.

Auxiliary system 806 may include one or more computing devices configured to perform primary processing operations of surgical system 800. The one or more computing devices included in auxiliary system 806 may control and/or coordinate operations performed by various other components (e.g., manipulating system 802 and/or user control system 804) of surgical system 800. For example, a computing device included in user control system 804 may transmit instructions to manipulating system 802 by way of the one or more computing devices included in auxiliary system 806. As another example, auxiliary system 806 may receive, from manipulating system 802, and process image data representative of imagery captured by an imaging device attached to one of manipulator arms 812.

In some examples, auxiliary system 806 may be configured to present visual content to surgical team members 810 who may not have access to the images provided to surgeon 810-1 at user control system 804. To this end, auxiliary system 806 may include a display monitor 814 configured to display one or more user interfaces, such as images (e.g., 2D images) of the surgical space, information associated with patient 808 and/or the surgical procedure, and/or any other visual content as may serve a particular implementation. For example, display monitor 814 may display images of the surgical space together with additional content (e.g., graphical content, contextual information, etc.) concurrently displayed with the images. In some embodiments, display monitor 814 is implemented by a touchscreen display with which surgical team members 810 may interact (e.g., by way of touch gestures) to provide user input to surgical system 800.

Manipulating system 802, user control system 804, and auxiliary system 806 may be communicatively coupled one to another in any suitable manner. For example, as shown in FIG. 8, manipulating system 802, user control system 804, and auxiliary system 806 may be communicatively coupled by way of control lines 816, which may represent any wired or wireless communication link as may serve a particular implementation. To this end, manipulating system 802, user control system 804, and auxiliary system 806 may each include one or more wired or wireless communication interfaces, such as one or more local area network interfaces, Wi-Fi network interfaces, cellular interfaces, etc.

Figure 10:
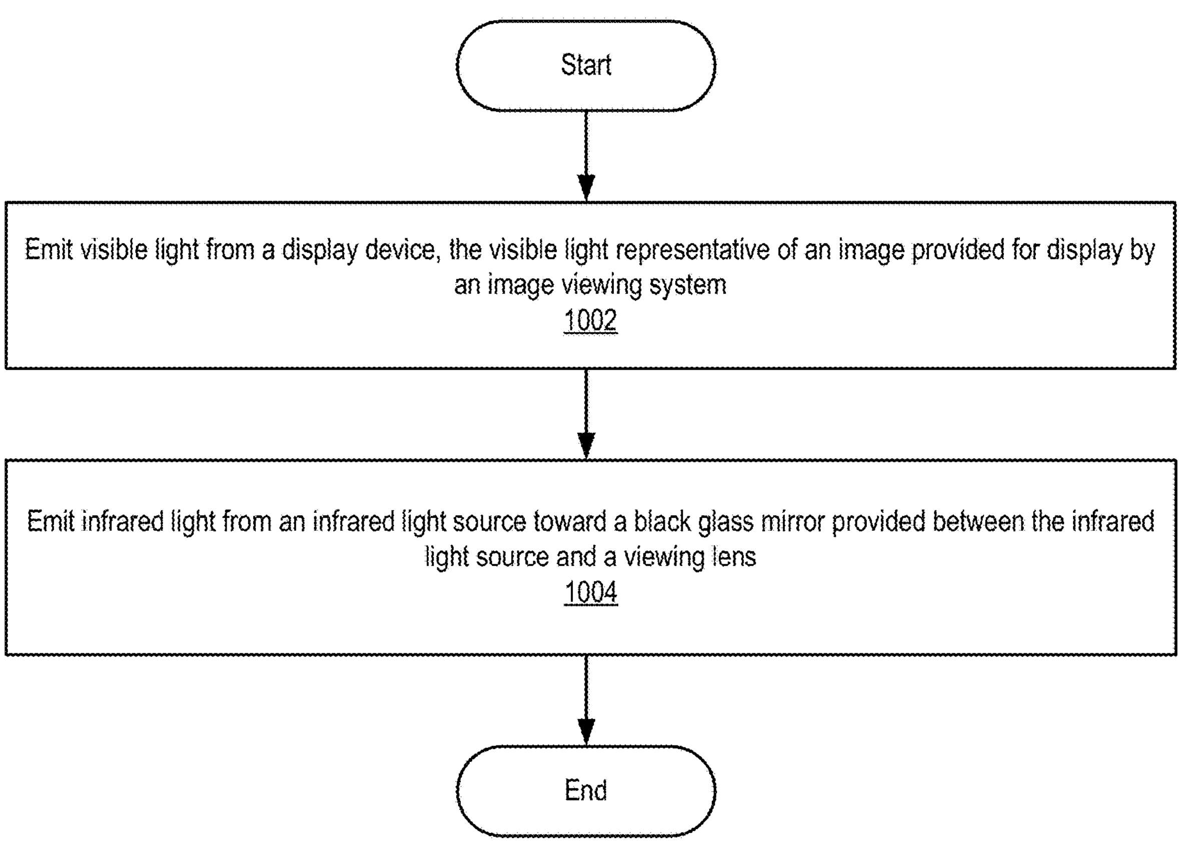
FIG. 10 illustrates an exemplary image viewing method using a black glass mirror according to principles described herein.

FIG. 10 illustrates an exemplary image viewing method using a black glass mirror. While FIG. 10 illustrates exemplary operations according to one embodiment, other embodiments may omit, add to, reorder, and/or modify any of the operations shown in FIG. 10. One or more of the operations shown in FIG. 10 may be performed by a system such as image viewing system 100, any components included therein, and/or any implementation thereof.

In operation 1002, a system (e.g., image viewing system 100, eye tracking system 400, etc.) may emit visible light from a display device. As described herein, the visible light may be representative of an image provided for display by the system. Operation 1002 may be performed in any of the ways described herein.

In operation 1004, the system may emit infrared light from an infrared light source toward a black glass mirror provided between the infrared light source and a viewing lens. The black glass mirror comprises black glass and a coating on an outer surface of the black glass. The coating is configured to reflect a first portion of the visible light emitted from the display device towards the viewing lens, pass a second portion of the visible light emitted from the display device to the black glass, and pass a portion of the infrared light emitted from the infrared light source toward the viewing lens. The black glass is configured to pass the portion of the infrared light passed by the coating and absorb the second portion of the visible light. Operation 1004 may be performed in any of the ways described herein.

In some examples, the system may generate an image based on a reflection of the infrared light off an eye of a user. For example, the system may use an imaging device (e.g., an infrared imaging device) to capture an image of an area that includes the eye of the user. Based on the generated image, the system may determine a gaze direction of the eye of the user in any suitable manner, such as described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
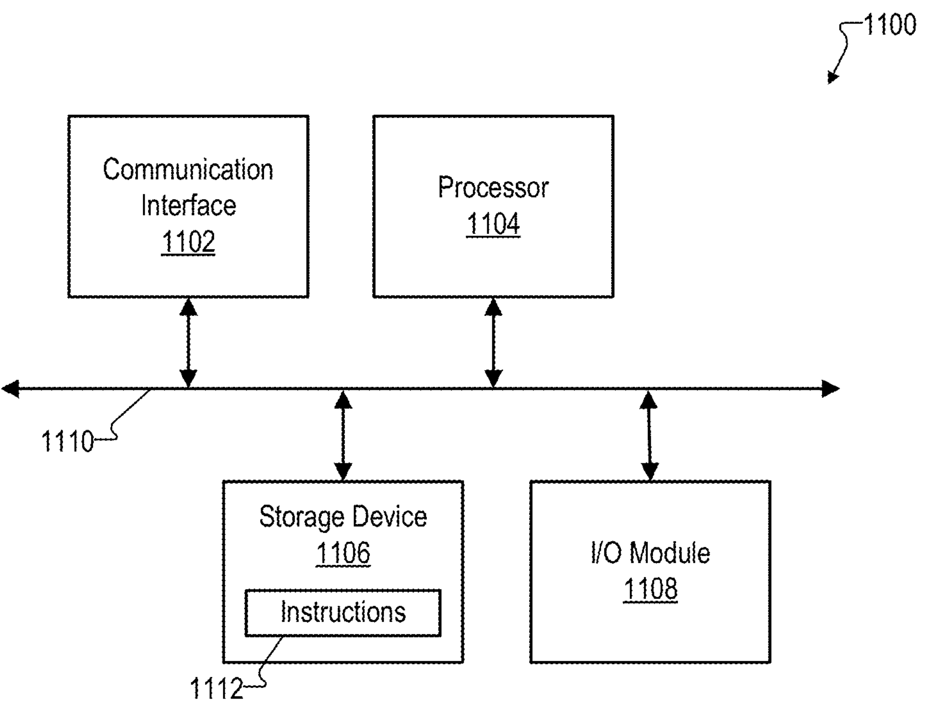
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1100. For example, storage facility 402 may be implemented by storage device 1106, and processing facility 404 may be implemented by processor 1104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An image viewing system comprising:

a display device configured to emit visible light representative of an image provided for display by the image viewing system;

an infrared light source configured to emit infrared light;

a viewing lens; and a black glass mirror provided between the infrared light source and the viewing lens, the black glass mirror comprising black glass and a coating on an outer surface of the black glass, the black glass mirror provided at an angle with respect to the viewing lens;

the coating being configured to reflect a first portion of the visible light emitted from the display device towards the viewing lens, pass a second portion of the visible light emitted from the display device to the black glass, and pass a portion of the infrared light emitted from the infrared light source toward the viewing lens; and the black glass being configured to pass the portion of the infrared light passed by the coating and absorb the second portion of the visible light, wherein the first portion of the visible light that is reflected by the coating at a central portion of the black glass mirror is representative of the image provided for display by way of the image viewing system.

2. The image viewing system of claim 1, wherein:

the viewing lens includes an outer surface; and an anti-reflective coating for the infrared light emitted from the infrared light source is provided on the outer surface of the viewing lens.

3. The image viewing system of claim 2, wherein:

the viewing lens further includes a plurality of layers that define a plurality of inner surfaces; and an additional anti-reflective coating for the infrared light emitted from the infrared light source is provided on each inner surface included in the plurality of inner surfaces.

4. The image viewing system of claim 1, further comprising an optical filter provided between the black glass mirror and an eye of a user, the optical filter configured to pass the infrared light emitted from the infrared light source, and act a polarizer with respect to the visible light emitted by the display device.

5. The image viewing system of claim 1, further comprising another infrared light source provided on a user-facing side of the viewing lens, the another infrared light source configured to illuminate an eye of a user with additional infrared light.

6. The image viewing system of claim 1, wherein the first portion of the visible light that is reflected by the coating comprises up to ninety-nine percent of the visible light.

7. The image viewing system of claim 1, wherein the coating includes a metal.

8. The image viewing system of claim 7, wherein the metal included in the coating comprises at least one of aluminum and silver.

9. The image viewing system of claim 1, wherein the black glass is a single layer of black glass on which a metallic coating is disposed.

10. The image viewing system of claim 1, further comprising an imaging device configured to:

detect the infrared light after the infrared light reflects off an eye of a user; and generate an image based on the detected infrared light.

11. The image viewing system of claim 1, wherein the image viewing system is provided as part of a stereoscopic image viewer included in a computer assisted surgical system.

12. The image viewing system of claim 1, wherein the coating extends substantially across an entirety of the outer surface of the black glass.

13. An eye tracking system comprising:

a display device configured to emit visible light representative of an image provided for display by the eye tracking system;

an infrared light source configured to emit infrared light;

a viewing lens;

an imaging device that is provided adjacent to the infrared light source and that is configured to detect the infrared light after the infrared light is reflected off an eye of a user, and generate an image based on the detected infrared light;

a processor configured to receive the generated image, and determine, based on the generated image, a gaze direction of the eye of the user;

a black glass mirror provided between the infrared light source and the viewing lens, the black glass mirror comprising black glass and a coating on an outer surface of the black glass, the black glass mirror provided at an angle with respect to the viewing lens;

the coating being configured to reflect a first portion of the visible light emitted from the display device towards the viewing lens, pass a second portion of the visible light emitted from the display device to the black glass, and pass a portion of the infrared light emitted from the infrared light source toward the viewing lens; and the black glass being configured to pass the portion of the infrared light passed by the coating and absorb the second portion of the visible light, wherein the first portion of the visible light that is reflected by the coating at a central portion of the black glass mirror is representative of the image provided for display by way of the image viewing system.

14. The eye tracking system of claim 13, wherein:

the viewing lens includes an outer surface; and an anti-reflective coating for the infrared light emitted from the infrared light source is provided on the outer surface of the viewing lens.

15. The eye tracking system of claim 13, wherein:

the viewing lens further includes a plurality of layers that define a plurality of inner surfaces; and an additional anti-reflective coating for the infrared light emitted from the infrared light source is provided on each inner surface included in the plurality of inner surfaces.

16. The eye tracking system of claim 13, further comprising another infrared light source provided on a user-facing side of the viewing lens, the another infrared light source configured to illuminate the eye of the user with additional infrared light.

17. The eye tracking system of claim 13, wherein the eye tracking system is provided as part of a stereoscopic image viewer included in a computer assisted surgical system.

18. The eye tracking system of claim 13, wherein the coating extends substantially across an entirety of the outer surface of the black glass.

19. A method comprising:

emitting, by an image viewing system, visible light from a display device, the visible light representative of an image provided for display by the image viewing system; and emitting, by the image viewing system, infrared light from an infrared light source;

the visible light and the infrared light being emitted toward a black glass mirror provided between the infrared light source and a viewing lens, the black glass mirror comprising black glass and a coating on an outer surface of the black glass, the black glass mirror provided at an angle with respect to the viewing lens;

the coating being configured to reflect a first portion of the visible light emitted from the display device towards the viewing lens, pass a second portion of the visible light emitted from the display device to the black glass, and pass a portion of the infrared light emitted from the infrared light source toward the viewing lens;

the black glass being configured to pass the portion of the infrared light passed by the coating and absorb the second portion of the visible light, and wherein the first portion of the visible light that is reflected by the coating at a central portion of the black glass mirror is representative of the image provided for display by way of the image viewing system.

20. The method of claim 19, further comprising:

generating, by the image viewing system, an image based on a reflection of the infrared light off an eye of a user; and determining, by the image viewing system based on the image, a gaze direction of the eye of the user.

* * * * *